United States Patent Office 2,706,719
Patented Apr. 19, 1955

2,706,719

POLYETHYLENE-WAX COMPOSITIONS AND PROCESS FOR MAKING SAME

Raymond G. Newberg, Roselle Park, Howard L. Wilson, Raritan Township, Middlesex County, and Andrew F. Sayko, Westfield, N. J., assignors to Esso Research and Engineering Company, a corporation of Delaware No Drawing. Application July 30, 1952,
Serial No. 301,787

4 Claims. (Cl. 260—28.5)

This invention relates to a process for polymerization of ethylene in the presence of wax and the production of improved modified wax compositions thereby.

It is known that liquid to solid polymers may be prepared by heating ethylene at controlled temperatures under superatmospheric pressures in the presence of specific catalysts, employing reaction media of either the aqueous or organic type, or in the absence of a reaction media. It is also known that the incorporation of certain of these polymers into paraffin or petroleum waxes imparts much improved properties to the waxes so modified. This is done by mechanical mixing of the molten petroleum wax with the extremely viscous polyethylene. The high molecular weight ethylene polymers dissolve with great difficulty in molten petroleum waxes. Various expediencies, such as stepwise or partial blending have not completely succeeded in solving the problem.

It has now been found possible to polymerize ethylene in a media of the paraffin wax itself, thereby utilizing the wax as a polymerization medium and producing the polyethylene in situ in the wax, eliminating completely the heretofore troublesome step of incorporating the polymer into the wax. The products thus produced show improved properties of sealing strength, blocking temperature, and cloud point. Advantages include elimination of polymer recovery equipment, elimination of solvent recovery equipment, elimination of wax blending facilities, and ease of handling by marketers and consumers.

The polymerization of ethylene in the wax media is initiated by organic and inorganic peroxides. The reaction temperature is controlled above the decomposition point of the particular peroxide used as the initiator. The temperature employed will generally be above 100° C. The ethylene pressure should be maintained at pressures of from 750 to 30,000 p. s. i. g.

It has been found that the products from this novel polymerization are novel homogeneous mixtures and possess improved properties over those obtained by mechanical blending of the wax and the polyethylene. These products are all particularly useful as improved hydrocarbon waxes and are especially valuable for coating on or incorporation into paper, fabric, or other cellulosic material into which the wax-polymer blend is absorbed. When the coated paper is employed as a wrapper, the lapped edges are readily heat sealed into each other to give a seal of high strength. At the same time, the presence of the polyethylene, prepared in the presence of the paraffin wax, destroys the tackiness of the paraffin surface and the tendency toward pressure flow of the paraffin, substantially raises the "blocking" temperature and does not produce mottled effects in the cold wax. This makes it possible to stack in piles the wax impregnated and cut sheets of paper or fabric and thereby facilitates the use of the coated paper in automatic commercial wrapping operations. The cloud points of these products compare favorably with those of the mechanically blended products, and, in some cases, appear even better. Furthermore, this process makes possible the economical and easy preparation of a wide variety of modified wax bases as are required.

The petroleum waxes best adapted for use in the present invention as polymerization media are the crystalline or paraffin waxes having melting points of from about 120° F. to about 165° F., and preferably from about 130° F. to about 145° F. Such waxes are of the type used for the coating or waxing of paper.

In carrying out the process of this invention, there can be used ethylene of 45% to 100% purity. The reaction is carried out by subjecting the ethylene of 85% to 100% purity to polymerization in the selected wax media at temperatures ranging from about 70° C. up to 225° C. and at pressures between 750 and 30,000 p. s. i. g.

Among the catalysts and initiators which can be employed in carrying out the process of this invention and which are commonly known as polymerization catalysts, there are included molecular oxygen and the per-oxygen or peroxide compounds both of the organic and inorganic classes such as lauroyl peroxide, ditertiary butyl peroxide, ammonium persulfate, sodium perborate, benzoyl peroxide, furyoyl peroxide, dicamphoryl peroxide, diethyl peroxide, dimethyl peroxide, tertiary butyl hydroperoxide, benzoperacid, furoperacid, camphor peracid, and acetoperacid; thermodecomposition products of organometallic compounds such as tetraethyl lead; hydrazinium compounds including hydrazine, hydrazine hydrochloride, semi-carbazide hydrochloride, and alpha, alpha, alpha-trimethylhydrazinium iodide; perchloro compounds such as hexachloroethane and octachloropropane; and salts of aromatic sulfonamides such as the N-chloraryl sulfonamides, exemplified by chloramine-T and chloramine-B as well as hydrogen peroxide.

At pressures below 10,000 p. s. i. g., organic peroxides are preferred. The temperature of ethylene polymerization in the wax media is from 70° C. to 225° C. depending on the decomposition point of the peroxide.

Although the amount of polymerization catalyst may vary somewhat depending on the particular catalyst used, it is generally employed in proportions of from 0.001% up to 5% of the total weight of monomers. The polymerization catalyst concentration is preferably included in the range of about 0.05% up to about 3% of the total reaction mixture.

The essential operating steps of the process consist of pumping molten petroleum wax into a reactor along with peroxide catalyst. After suitable adjustment of the reactor size and stream rates to permit sufficient polymerization of the ethylene, the ethylene polymer-wax blend is allowed to flow out of the unit continuously into a depressurizing chamber. The unreacted ethylene is recycled back for further polymerization from the top of the depressurizing drum. From the bottom of this same drum, the ethylene polymer-wax blend flows into a small chamber to permit the addition of further molten wax as diluent and in order to adjust the polymer concentration to the desired level. Then the polymer-wax blend can be cast into blocks for shipment or it may be shipped molten in tank cars.

The vessel used in carrying out this invention must be fabricated of materials capable of withstanding the conditions of temperature and pressure employed for the polymerization. That portion of the equipment which comes into actual contact with the polymerization system should preferably be made from or lined with a material which does not corrode rapidly, or which will not affect the reactants. Suitable materials of construction as well as linings include glass, enamel, silver, aluminum, tin, stainless steels which contain 18–20% chromium and 8–14% nickel, nickel, and manganese alloys containing high proportions of nickel.

The polymerization may be carried out batchwise, continuously, or semi-continuously.

Clear solutions of the resulting new wax-polyethylene mixtures prepared by this novel method are obtained at temperature ranges between about 60° and 150° C., depending on the initial melting point of the wax and the concentration of the polymer in the wax, and are readily incorporated into paper or other fabric material by well-known trade methods. The polyethylene in wax mixtures so prepared will generally be found to contain from 0.25 up to 30% of the polymer and from 99.75 to 70% of paraffin wax.

The invention is illustrated by the following examples but it is not intended to limit the invention thereto.

EXAMPLE I

The polymerization was carried out in a pressure autoclave equipped with a mechanical agitator and suitable safety devices for operation to at least 10,000 p. s. i. g. The autoclave was heated to about 70° C. by means of circulating oil. About 853 g. of hot paraffin wax and 2.3 g. of ditertiary butyl peroxide catalyst were added to the hot reactor. After closing the fill-port, ethylene was purged through the unit twice to eliminate air. Then the 99.5% pure ethylene was introduced into the autoclave by means of a plunger pump until the pressure of 3,300–3,500 p. s. i. g. was obtained at 110–120° C. Heat by means of hot circulating oil in the autoclave jacket was applied during the reaction period of 35 minutes. At this point, the reaction was cooled to about 90–105° C., and reaction ceased, and the molten product was then discharged into a receiver. The polymer-wax product was diluted with fresh paraffin wax and employed directly for product testing.

After cooling and before dilution, the product was a waxy solid, with a polymer concentration of 8.3% in the wax. The cloud point of the mixture was 198° F. The yield of product indicated a catalyst efficiency of 33 grams of polymer per gram of catalyst. The Staudinger molecular weight of the polymer was about 1280.

After dilution to about 1% polymer in wax, the product was evaluated as follows:

Cloud point, °F _____ 182
Blocking temperature, °F _____ 128
Sealing strength, dynes/cm.² _____ 61.7

Molecular weight

The solution viscosity technique has generally been employed for determining average molecular weights of polyethylene polymers. Viscosity measurements are made at 85° C. with dilute (10 mg./cc.) solutions of polymer in xylene and the data converted to molecular weight by Staudinger's equation, wherein the constant $K = 0.85 \times 10^{-4}$. The comparatively high temperature level is necessary because of the extremely poor solubility of the polymers at ordinary temperatures.

However, polymers prepared in a paraffin wax medium have been handled differently because of unsatisfactory isolation of pure polymer from the wax-polymer product. A relationship was established between known molecular weights of previous polymers and the viscosity at 220° F. for 5% solutions of these polymers in 130–132° F. paraffin wax. Molecular weight values are obtained by determining kinematic viscosity at 220° F. for the polymer-wax product diluted to a 5% polymer concentration. Then the straight line relationship, $M.W. = 721V - 1924$ where M. W.=viscosity average molecular weight and $V$=viscosity in centistokes, is employed.

Cloud point determination

The temperature at which the polymer will start to precipitate from the wax blend is designated as the cloud point. This point governs the temperature level at which any coating or impregnating operation may be conducted. Cloud points are obtained by heating the wax blend until a clear solution is obtained and then noting the temperature at which a cloud appears as the blend is slowly cooled.

In some cases a clear point is desired. This is the point at which a clear solution is obtained as the blend is heated. A clear point is ordinarily from 3° F. to 10° F. higher than the corresponding cloud point.

Preparation of coated sample strips

Specimens for evaluating sealing strength and blocking temperature are prepared by coating a white opaque sulfite paper (breadwrap stock) having a basic weight of 24.0–26.5 lbs. per ream (500—24" x 36" sheets). A suitable apparatus for preparing hand-waxed paper strips comprises a rack for the unwaxed paper, a hot plate, wax bath, steam heated wire wound "doctor" rods to give smooth and uniform wax films, and a water bath to quickly chill the wax coating.

With the wax blend at 200° F.±5° F., the paper strip is pulled through the apparatus at a rate of approximately ½ foot/sec. If the strip is pulled too fast, the surface will have cracks or pock marks somewhat similar to a herringbone design. A slow pulling rate gives ridges across the strip and usually a poorer gloss is obtained. The desired coating has a smooth, high gloss surface.

Blocking point determination

Wax blocking point is defined as the lowest temperature at which waxed papers will stick together sufficiently to permanently injure the surface films and performance properties. Briefly, the test used consists of placing a pair of hand-coated waxed papers on a metal bar having a 55–65° F. temperature gradient along its length. After several hours, the strips are removed and the point of first distinct blocking is noted. The temperature corresponding to this point is obtained from the calibration curve for the instrument.

The first section of the tested strip should be smooth and generally glossy. A fairly sharp point will be observed where the surface is suddenly dull and marked.

Sealing strength

For all packaging applications the seal between overlapping sheets of coated paper must resist failure from repeated handling. The sealing strength is a measure of the amount of force required to separate two sheets of wax coated paper which have been heat sealed. Specimens are prepared by lightly pressing together two wax coated strips of paper at 200° F. with a stainless steel roller (weight=98 gm.). These strips are cooled immediately by immersing them in a water bath held at 70° F. This cooling temperature must be consistent for all samples since sealing strength varies considerably with cooling temperature.

Sealing strength data are obtained by measuring the force needed to pull apart a 1" x 4" sealed specimen. The Twing tear tester apparatus is employed for this determination.

EXAMPLE II

A series of experiments was carried out in order to determine the effects of variables in relation to results obtained. The data of this series of experiments are shown in Tables I and II together with the controls. In general, the experiments were carried out in the same manner as described in Example I.

TABLE I

| Run No. | Reactor Medium | | Polymerization | | | | | |
|---|---|---|---|---|---|---|---|---|
| | Quantity of Paraffin wax, g. | Quantity of Catalyst, g.[1] | Pressure Range, P. s. i. g. × 10⁻³ | Temperature Range, °C. | Elapse Time, min. | Yield of Polymer, g. | Reactor Effluent Pol. Conc. percent [2] | Catalyst Efficiency, g. pol./g. cat. |
| 1 | 955 | 1.08 | 3.5–3.2 | 116–131 | 90 | 212 | 18.2 | 196 |
| 2 | 958 | 1.09 | 3.5–3.3 | 114–121 | 136 | 177 | 15.6 | 162 |
| 3 | 861 | 2.27 | 3.5–3.3 | 112–121 | 65 | 137 | 13.7 | 60 |
| 4 | 853 | 2.30 | 3.5–3.3 | 111–120 | 35 | 77 | 8.3 | 33 |

[1] Di-tertiary butyl peroxide.
[2] Based on polymer plus wax.

TABLE II

| Run No. | Staudinger Mol. Wt. of Polymer | Screening Evaluation—1% Polymer in Paraffin Wax | | |
|---|---|---|---|---|
| | | Cloud Pt., °F. | Blocking Temp., °F. | Sealing Strength, dynes/cm.² |
| 1 | 1,220 | 172 | 128 | 46.5 |
| 2 | 1,250 | 172 | 125 | 46.1 |
| 3 | 1,310 | 180 | 128 | 46.6 |
| 4 | 1,280 | 182 | 128 | 61.7 |
| Control ¹ | | | 98 | 26 |

¹ Paraffin wax, 130° F. M. P.—no polyethylene.

The data of the above Table II clearly show the striking improvements obtained by the use of this invention in obtaining polyethylene-wax blends. The products prepared according to this invention show much higher blocking temperature values and over twice the sealing strength of the control which is the paraffin wax with no modification.

EXAMPLE III

For comparative purposes, similar evaluations were made on a blend prepared by mixing 1% of previously polymerized polyethylene in paraffin wax. The paraffin wax originally had a 98° F. blocking temperature and a 26 dynes/cm.² sealing strength. The cloud point of the blend of wax with polymer was 181, the blocking temperature 128 and the sealing strength 39.6 dynes/cm.². Thus it is shown that the products made by polymerizing in a wax medium have the same superior cloud point and blocking temperature values and, in addition, much higher sealing strengths than do the products made by mechanical blending to prepare the same concentration of polymer in wax.

What is claimed is:

1. In a process involving the polymerization of ethylene at a temperature above 70° C. and a pressure between 750 and 30,000 p. s. i. g., in the presence of a polymerization catalyst, the improvement which comprises conducting the polymerization in the presence of molten petroleum wax, thereby producing a mixture of polyethylene in said wax.

2. In a process involving the polymerization of ethylene at a temperature between 70° and 225° C. and a pressure between 750 and 30,000 p. s. i. g. in the presence of a polymerization catalyst of the peroxide type, the improvement which comprises conducting the polymerization in the presence of a molten petroleum wax having a melting point of 120° F. to 165° F.

3. A process for the production of polyethylene in wax mixtures which comprises maintaining ethylene under pressure between about 750 and 30,000 p. s. i. g. and at temperatures between about 70° and 225° C. in the presence of molten petroleum wax reaction media and in contact with from about 0.05% up to about 3% of a peroxide polymerization catalyst.

4. A process for the production of polyethylene in paraffin wax mixtures which comprises maintaining ethylene under pressures between about 3,300 to 3,500 p. s. i. g. and at temperatures between about 110° and 120° C. in the presence of a paraffin wax reaction media and in contact with di-tertiary-butyl peroxide as a polymerization catalyst.

References Cited in the file of this patent

UNITED STATES PATENTS

| 2,523,705 | Lovell et al. | Sept. 26, 1950 |
| 2,582,037 | Hyde | Jan. 8, 1952 |

FOREIGN PATENTS

| 637,586 | Great Britain | May 24, 1950 |